US007693680B2

(12) United States Patent
Ishii

(10) Patent No.: US 7,693,680 B2
(45) Date of Patent: Apr. 6, 2010

(54) COMMUNICATIONS SYSTEM FOR POSITION DETECTOR

(75) Inventor: Koh Ishii, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/081,016

(22) Filed: Apr. 9, 2008

(65) Prior Publication Data

US 2009/0157347 A1 Jun. 18, 2009

(30) Foreign Application Priority Data

Dec. 12, 2007 (JP) ............................ 2007-320458

(51) Int. Cl.
*G06F 15/00* (2006.01)

(52) U.S. Cl. ......................... 702/150; 318/516; 702/34; 702/151

(58) Field of Classification Search ................... 702/33, 702/34, 35, 36, 56, 150, 151; 700/83, 169; 73/714; 318/561
See application file for complete search history.

(56) References Cited

U.S. PATENT DOCUMENTS 4,195,250 A * 3/1980 Yamamoto .................. 318/561
7,039,548 B2 5/2006 Takano et al.
2005/0049801 A1 * 3/2005 Lindberg et al. .............. 702/34

FOREIGN PATENT DOCUMENTS

JP 2000-315103 A 11/2000
JP 2005-287133 A 10/2005
RU 2 292 997 C2 4/2006

* cited by examiner

*Primary Examiner*—John H Le
(74) *Attorney, Agent, or Firm*—Birch, Stewart, Kolasch & Birch, LLP

(57) ABSTRACT

A communications system for a position detector comprises a position detector for detecting the amount of movement of a table, an A/D converter connected to the position detector, a numerical control device connected to the A/D converter and receiving a position signal converted by the A/D converter, and an information processor connected to the A/D converter via a USB capable of bidirectional communication. The information processor includes a storage section for preserving data and a program, a computing section for computationally operating the program, and a display section for indicating the results of computational operation by the computing section, and the data.

9 Claims, 8 Drawing Sheets

11
12
13
14
15
16
17
30
A-PHASE
B-PHASE
+
−

P1
NONE OF DATA (1) TO (7) CAN BE OBTAINED
P2
ABNORMALITY DATA (7) HAS BEEN RECEIVED
P3
DATA (6) DEVIATES FROM ALLOWABLE VALUE
INDICATE ABNORMALITY
P4

COMMUNICATIONS SYSTEM FOR POSITION DETECTOR

BACKGROUND OF THE INVENTION

1. Field of the Invention

This invention relates to a communications system for a position detector, which is effective when applied, particularly, as a communications system for a position detector for use in machine tools, automobiles, robots, etc.

2. Description of the Related Art

A position detector, which detects the position of a machine, is utilized in a numerical control (or NC) machine tool equipped with an NC device. The NC machine tool controls a drive section based on a signal from an NC control section to move the machine. The amount of movement at this time is detected by the position detector. Relevant detection data is inputted into the NC device via an A/D converter. That is, the NC machine tool exercises feedback control with the use of the position detector to control the position of the machine with high accuracy. Incremental output or serial communication, comprising digital pulse signals of A-phase or B-phase, is used as an output from the A/D converter to the NC device. These outputs (incremental output and serial communication) are presented only one-way from the position detector to the NC device.

JP-A-2000-315103 discloses an administrative system for an NC machine tool. In this administrative system for an NC machine tool, a personal computer is connected to a controller section of the NC machine tool via a network. A display of the personal computer indicates a plurality of operating icons which have functions conformed to control commands of the NC machine tool. These operating icons are selectable by a mouse. Furthermore, the operating state of the NC machine tool is examined and, depending on this operating state, the operating icon is prohibited from pointing to a command.

The above-mentioned incremental output is a general-purpose communications protocol for the NC device, and contains only positional information on the machine. The serial communication, on the other hand, is a communications protocol unique to the NC device, which is the receiver of communication from the position detector, and has no versatility. Moreover, data included in the serial communication has limited contents, such as a break in a wire. Thus, even the use of serial communication has posed difficulty in pinpointing the location of failure.

If mounting, adjustment, checking for failure, or the like is performed in the aforementioned NC machine tool, an operation for confirming settings of the position detector and an output signal from this detector is carried out. This operation is performed, with the connection between the position detector and the numerical control device being cut off and, in this state, a position indicator (counter device) dedicated for the position detector being connected to the position detector. That is, the numerical control device is once stopped, and the connection between the numerical control device and the position detector is cut off. In this state, the position detector and the position indicator are connected, and information displayed on the position indicator is confirmed. Thus, maintenance work itself has been complicated. After completion of the confirming operation, moreover, the connection between the position detector and the position indicator has to be cut off, and the position detector and the numerical control device have to be connected. This operation itself has also been complicated. With the above procedure, moreover, the numerical control device, which is a constituent of the system, is disconnected, and the position indicator, which is not a constituent of the system, is separately connected. Hence, there has been a possibility that the location of failure cannot be pinpointed.

With the administrative system for an NC machine tool described in JP-A-2000-315103, the control section of the NC machine tool, to which the personal computer is connected, differs according to various machine tools. Thus, the settings on the personal computer side have to be changed in conformity with the specifications of the control section. As seen here, the administrative system has not been versatile.

The present invention has been proposed in light of the above-described problems. It is an object of the invention to provide a communications system for a position detector, which is versatile, which can perform maintenance work in a state connected to a numerical control (NC) device, and which improves the accuracy of the maintenance work.

SUMMARY OF THE INVENTION

A first aspect in accordance with the present invention provides a communications system for a position detector, comprising: a position detector for detecting an amount of movement of a machine; an A/D converter connected to the position detector; a numerical control device connected to the A/D converter and receiving a position signal converted by the A/D converter; and an information processor connected to the A/D converter via bidirectional communication means capable of bidirectional communication, wherein the information processor is a device including a storage section for preserving data and a program, a computing section for computationally operating the program, and a display section for indicating results of computational operation by the computing section, and the data.

According to a second aspect of the present invention, the program may have the function of indicating an abnormality on the display section, if none of position data on the position detector, internal state data on the position detector, manufacturer's serial number data on the position detector, model data on the position detector, version data on the position detector, internal signal data on the position detector, and abnormality data on the position detector can be obtained, or if the abnormality data on the position detector has been received, or if the internal signal data on the position detector deviates from an allowable value.

According to a third aspect of the present invention, the program may have the function of determining whether internal signal data on the position detector is within a prescribed value when the adjustment mode of the position detector is set, and indicating the acceptability or unacceptability of adjustment on the display section.

According to a fourth aspect of the present invention, the program may have the function of preserving various data, including position data on the position detector, internal state data on the position detector, internal signal data on the position detector, and abnormality data on the position detector, in the storage section periodically.

According to a fifth aspect of the present invention, the program may have the function of determining whether a difference between current data on the position detector and data thereon during installation thereof is within a prescribed value, and indicating abnormality or normality on the display section.

According to a sixth aspect of the present invention, the program may have the function of setting the adjustment mode of the position detector.

According to a seventh aspect of the present invention, the program may have the function of changing internal parameters of the position detector.

According to an eighth aspect of the present invention, the program may have the function of writing correction data for the position detector.

According to a ninth aspect of the present invention, the program may have the function of changing the software version of the position detector.

A tenth aspect in accordance with the present invention provides a machine tool including the communications system for a position detector according to the first aspect, wherein the machine is a table on which a workpiece is installed, or is a tool for machining the workpiece.

As described above, the communications system for a position detector, as the first aspect, comprises the position detector for detecting the amount of movement of a machine, the A/D converter connected to the position detector, the numerical control device connected to the A/D converter and receiving a position signal converted by the A/D converter, and the information processor connected to the A/D converter via bidirectional communication means capable of bidirectional communication, the information processor being a device including the storage section for preserving data and a program, the computing section for computationally operating the program, and the display section for indicating the results of computational operation by the computing section, and the data. Because of this feature, computation can be performed by the information processor based on the data inputted through the A/D converter, and data required for maintenance can be indicated on the display section of the information processor for the purpose of confirmation. Thus, maintenance work can be done, without disconnection from the numerical control device. Furthermore, the information processor is always connected to the A/D converter, and its bidirectional data communication with the A/D converter is possible. Also, the system configuration during system maintenance is the same as that while the system is in operation. Thus, information on the instruments constituting the system can be entered into the information processor through the A/D converter, thereby improving the accuracy of maintenance work on the system. The A/D converter, the information processor and the bidirectional communication means themselves are generapurpose products, thus making the system versatile.

According to the communications system for a position detector, as each of the second to ninth aspects, the computing section has the functions of computationally operating predetermined programs. Thus, the maintainer can easily make adjustment of the position detector, with the numerical control device being connected. Since the configuration of the system during maintenance is the same as that in operation, moreover, the accuracy of maintenance work is improved.

The machine tool as the tenth aspect includes the communications system for a position detector according to any one of the second to ninth aspects, the machine being a table on which a workpiece is installed, or being a tool for machining the workpiece. Thus, the maintainer can easily make adjustment of the position detector, with the numerical control device being connected. Since the configuration of the system during maintenance is the same as that in operation, moreover, the accuracy of maintenance work is improved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The best mode of the communications system for a position detector according to the present invention will be described concretely with reference to the accompanying drawings.

First Embodiment

A first embodiment, in which the communications system for a position detector according to the present invention is applied to a numerical control device for numerically controlling the table of a machine tool, will be described with reference to FIGS. 1A, 1B to FIG. 11.

Figure 1:
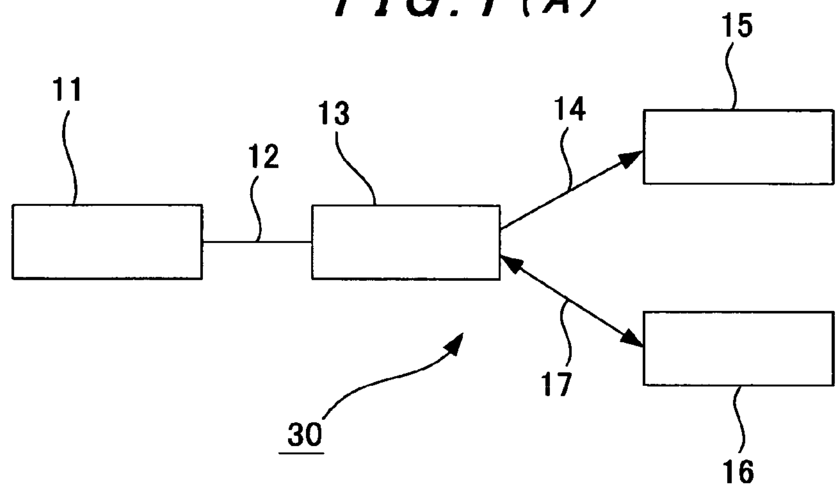
FIG. 1A is a schematic configurational drawing of a first embodiment of a communications system for a position detector according to the present invention.
FIG. 1B is an incremental characteristics chart of an A/D converter in the communications system.
Figure 1:
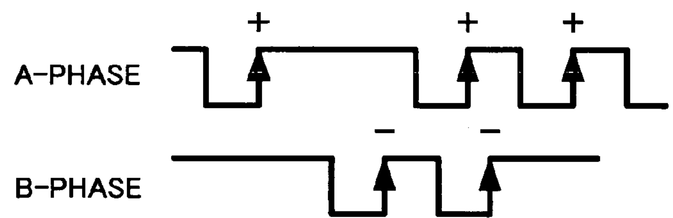
Figure 2:
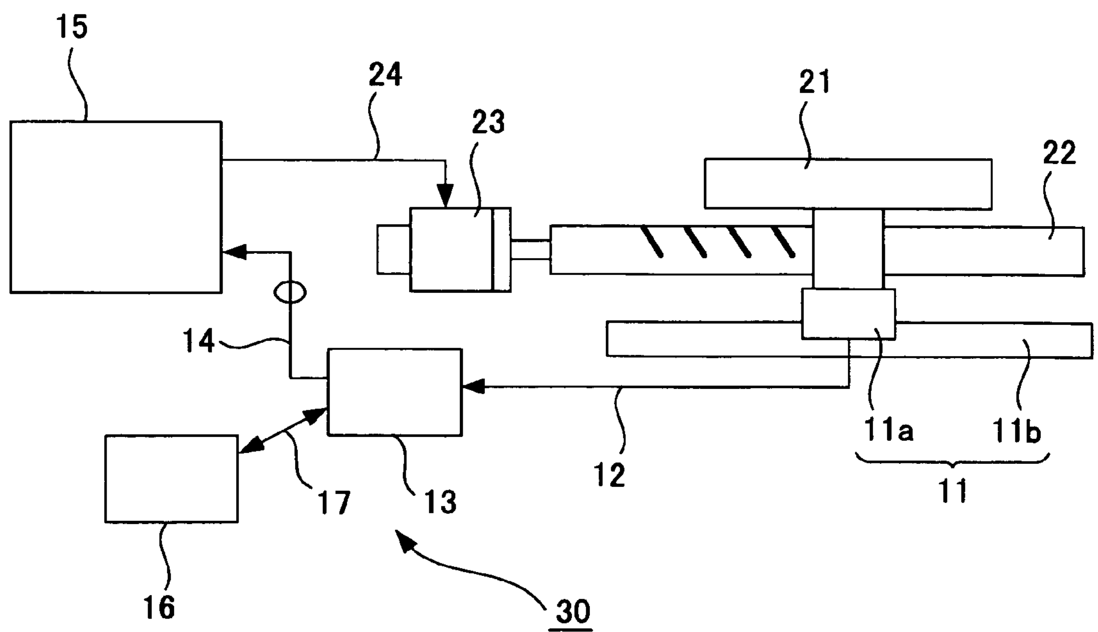
FIG. 2 is a view showing an example of the first embodiment of the communications system for a position detector according to the present invention.

FIG. 1A is a schematic configurational drawing of a communications system for a position detector. FIG. 1B is an incremental characteristics chart of an A/D converter in the communications system. FIG. 2 is a view showing an example of the communications system for a position detector. FIGS. 3 to 11 are views showing programs which are computationally operated by an information processor provided in the communications system for a position detector.

A communications system 30 for a position detector according to the present embodiment is equipped with a position detector 11 for detecting the position of a table 21 on which a workpiece (not shown) is installed, as shown in FIGS. 1A, 1B and 2. The table 21 is provided to be capable of traveling on a ball screw 22. A shaft of a motor 23 is coupled to the ball screw 22. By driving the motor 23, the ball screw 22 is rotated, and the table 21 moves along the ball screw 22.

The position detector 11 is furnished with a movable portion 11*a* attached to the table 21, and a fixed portion 11*b* where the movable portion 11*a* is provided movably. The position detector 11 detects the position of the table 21 by having the movable portion 11*a* moving on the fixed portion 11*b*. The position detector 11 is connected to an A/D converter 13 via a first data transmission cable 12. Thus, position data on the table 21 ascribed to detection by the position detector 11 is inputted into the A/D converter 13.

The A/D converter 13 is connected to a numerical control device 15 via a second data transmission cable 14. Thus, incremental data (A-phase, B-phase), which is a positional signal converted by the A/D converter 13, is inputted into the numerical control device 15. The numerical control device 15 counts the number of times that pluses (+) appear in the A-phase and the number of times that minuses (−) appear in the B-phase, thereby detecting the amount of movement of the table 21.

The numerical control device 15 is connected to the motor 23 via a third data transmission cable 24. Thus, the numerical control device 15 computes the amount of driving of the motor 23 based on the positional signal from the A/D converter 13, and computes the difference between this computed amount and the value inputted into the numerical control device 15 to drive the motor 23.

The above-mentioned A/D converter 13 is connected to an information processor 16 via a universal serial bus (USB) 17 which is a bidirectional communication means capable of data communication in both directions. An example of the information processor 16 is a personal computer. Thus, the A/D converter 13 can communicate data to and from the information processor 16 while ensuring communication with the numerical control device 15.

The information processor 16 is a device having a storage section (memory and hard disk) for preserving various data, such as data from the A/D converter 13 and data within the information processor 16, and programs; a computing section (CPU) for computationally operating the programs; and a display section (display) for indicating the various data and the results of computational operation by the computing section. An example of the information processor 16 is a personal computer (PC).

As the data communicated, the following 9 types of data, for example, are named:

(1) Position data by the position detector 11

(2) Internal state data on the position detector 11 (e.g., data such as "during startup", "completion of startup", and various settings of switches)

(3) Manufacturer's serial number data on the position detector 11

(4) Model data on the position detector 11

(5) Version data on the position detector 11

(6) Internal signal data on the position detector 11 (e.g., waveform data on a feedback signal (data at respective times))

(7) Abnormality data on the position detector 11 (e.g., data on the location of a break)

(8) Setting of the position detector 11 by the information processor 16 (e.g., setting of various functions of the detector itself)

(9) Writing of software from the information processor 16 to the position detector 11 (e.g., writing of a program to the program preserving section within the detector)

The communicated data (1) to (7) are the communicated data outputted from the position detector 11 to the information processor 16. The communicated data (8) and (9) are the communicated data outputted from the information processor 16 to the position detector 11.

The above-mentioned storage section of the information processor 16 preserves, for example, the following programs (I) to (IX), and the information processor 16 computationally operates these programs.

Figure 3:
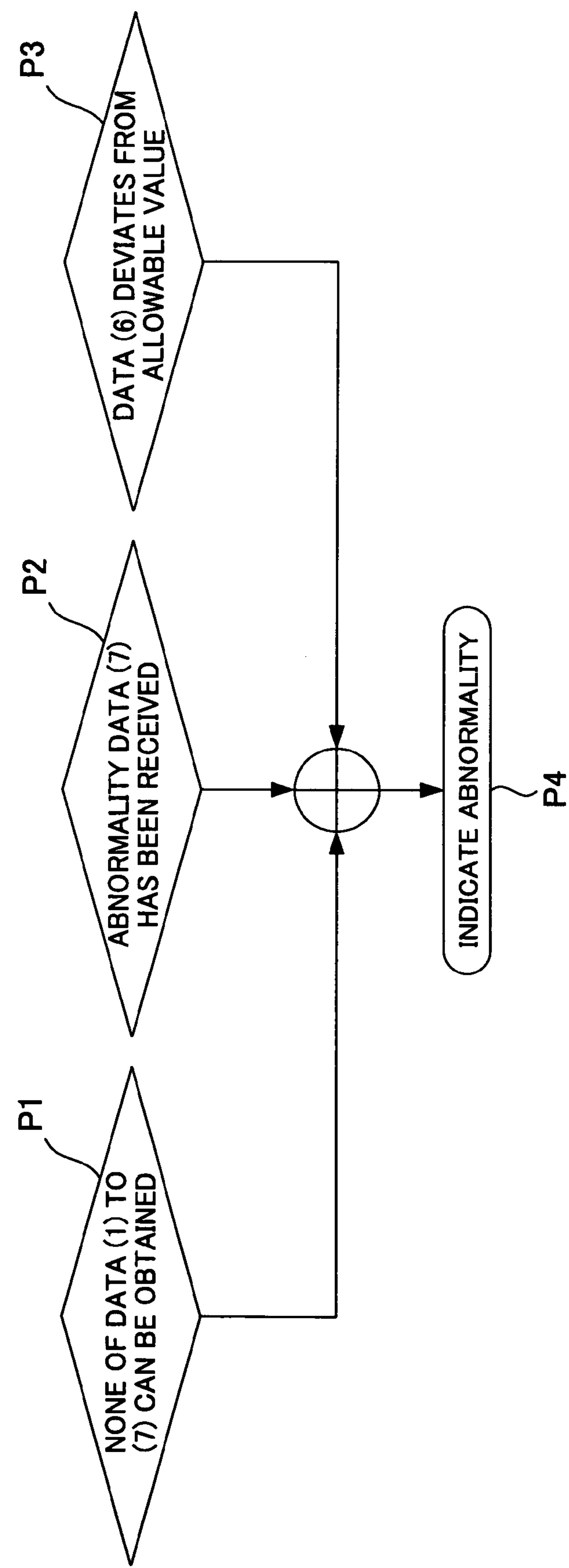
FIG. 3 is a view showing a program which is computationally operated by an information processor provided in the first embodiment of the communications system for a position detector according to the present invention.

Program (I):

This program makes failure and abnormality diagnoses by data analysis. That is, as shown in FIG. 3, it is determined in Step P1 whether none of the aforementioned data (1) to (7) can be obtained. In Step P1, if none of the data (1) to (7) can be obtained, an abnormality is determined, and the program proceeds to Step P4. In Step P2, it is determined whether the data (7) (abnormality data) has been received. In Step P2, if the data (7) has been received, an abnormality is determined, and the program proceeds to Step P4. In Step P3, it is determined whether the data (6) deviates from an allowable value. In Step P3, if the data (6) deviates from the allowable value, an abnormality is determined, and the program proceeds to Step P4. That is, if an abnormality is determined in Step P1, Step P2 or Step P3, the program proceeds to Step P4. In Step P4, the presence of the abnormality is indicated on the display section of the information processor 16. Thus, if the position detector 11 fails or becomes abnormal, this state can be easily confirmed by a maintainer, and the accuracy of maintenance is improved.

Figure 4:
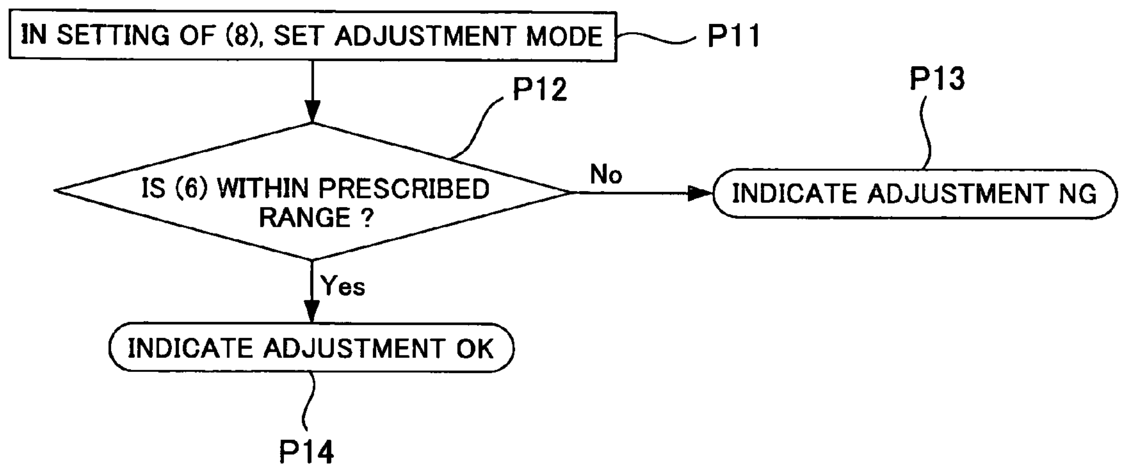
FIG. 4 is a view showing another program which is computationally operated by the information processor provided in the first embodiment of the communications system for a position detector according to the present invention.

Program (II):

This program determines whether the adjustment of the position detector 11 is correct. That is, in Step P11, an adjustment mode is set in the setting of (8) above, and the program proceeds to Step P12, as shown in FIG. 4. In Step P12, it is determined whether the data (6) is within a prescribed range. If the data (6) is not within the prescribed range, the program proceeds to Step P13. In Step P13, it is indicated on the display section of the information processor 16 that the adjustment of the position detector 11 has failed (adjustment NG). If the data (6) is within the prescribed range, the program proceeds to Step P14. In Step P14, it is indicated on the display section of the information processor 16 that the adjustment of the position detector 11 has been successful (adjustment OK). Thus, the maintainer can easily make the adjustment of the position detector 11, with the numerical control device 15 being connected.

Figure 5:
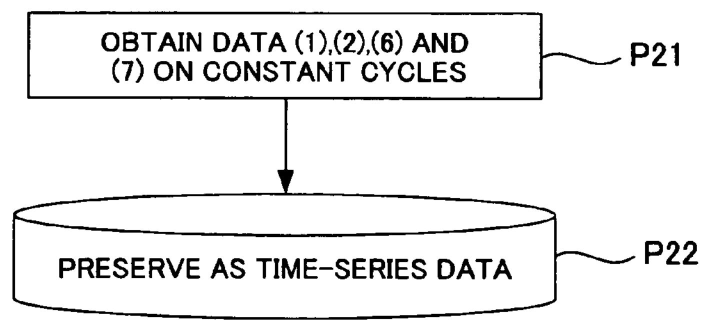
FIG. 5 is a view showing another program which is computationally operated by the information processor provided in the first embodiment of the communications system for a position detector according to the present invention.

Program (III):

This program preserves a data log of the position detector 11. That is, as shown in FIG. 5, the data (1), the data (2), the data (6), and the data (7) are acquired at predetermined time intervals (on constant cycles), and the program proceeds to Step P22. In this Step P22, these various data (data (1), data (2), data (6), and data (7)) are preserved in the storage section of the information processor 16. Hence, the maintainer can easily obtain information on the past state of the position detector 11, with the numerical control device 15 being connected. For an event which occurs at a low frequency, the situation at a time when the event occurred can be recorded, without disconnection of the numerical control device 15 and the position detector 11, and the records can be utilized for tracking down the cause of the failure. Thus, highly accurate failure analysis can be made.

Figure 6:
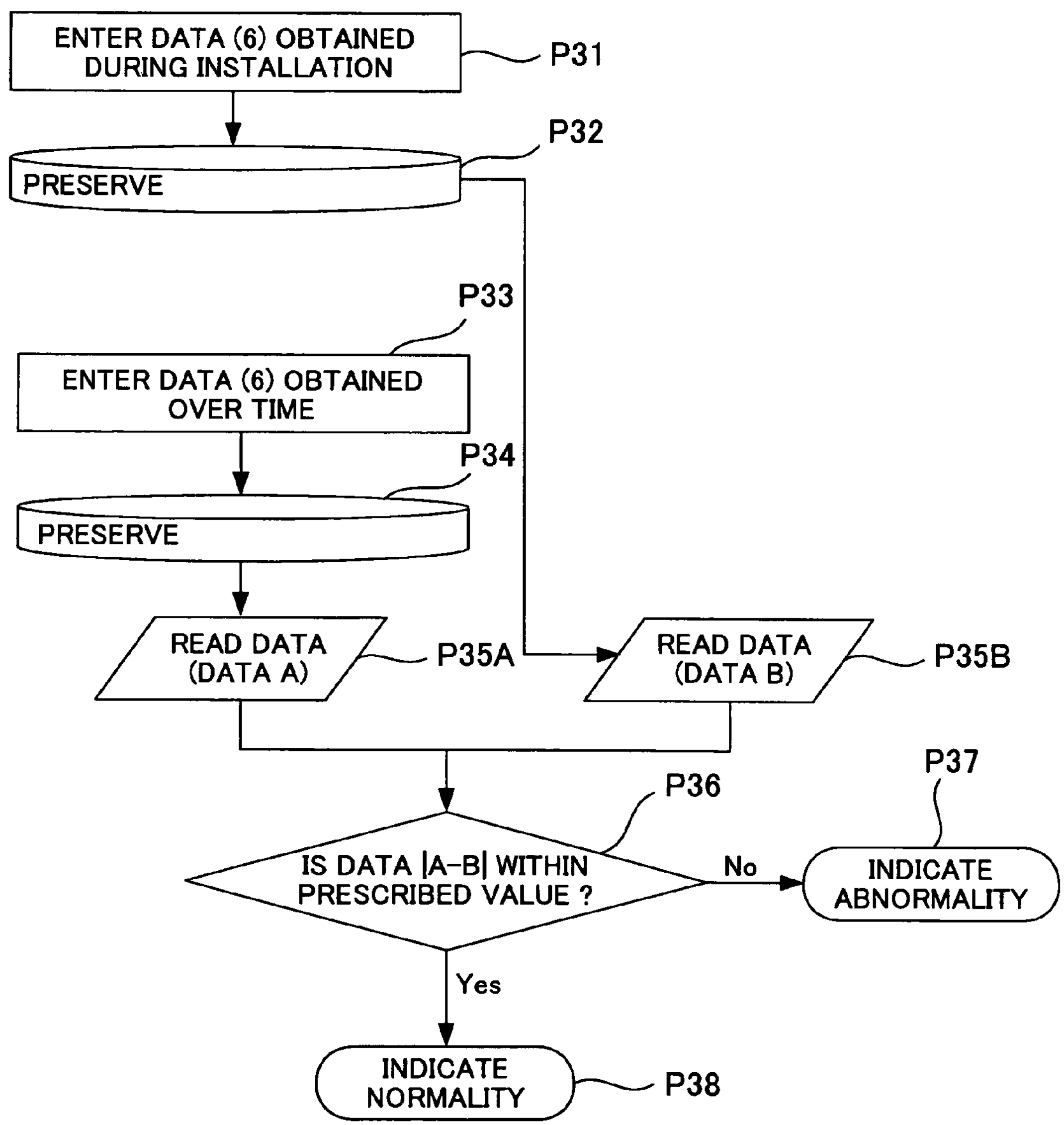
FIG. 6 is a view showing another program which is computationally operated by the information processor provided in the first embodiment of the communications system for a position detector according to the present invention.

Program (IV):

This program diagnoses secular changes of the position detector 11. That is, as shown in FIG. 6, internal signal data on the position detector (data (6)) obtained during installation is inputted in Step P31, and the program proceeds to Step P32. In this Step P32, the data inputted in Step P31 is preserved in the storage section of the information processor 16. On the other hand, internal signal data on the position detector (data (6)) after installation (over time) is inputted in Step P33, and the program proceeds to Step P34. In this Step P34, the data inputted in Step P33 is preserved into the storage section of the information processor 16. Step P33 is carried out at predetermined time intervals, and the data (6) over time, which is preserved in the storage section of the information processor 16, is updated at predetermined time intervals. Then, the program proceeds to Step P35A and Step P35B, where data A and data B, respectively, are read from the storage section of the information processor 16. Then, the program proceeds to Step P36, where it is determined whether the difference between the data A and the data B is within a prescribed value. If the difference between the data A and the data B is not within the prescribed value, the program proceeds to Step P37. In Step P37, it is indicated on the display section of the information processor 16 that the position detector 11 has undergone aged deterioration (indication of abnormality). If the difference between the data A and the data B is within the prescribed value, the program proceeds to Step P38. In Step P38, it is indicated on the display section of the information processor 16 that the position detector 11 has not undergone aged deterioration (indication of normality). Thus, the maintainer can easily diagnose the failure or abnormality of the position detector 11 due to aged deterioration, with the numerical control device 15 being connected.

Figure 7:
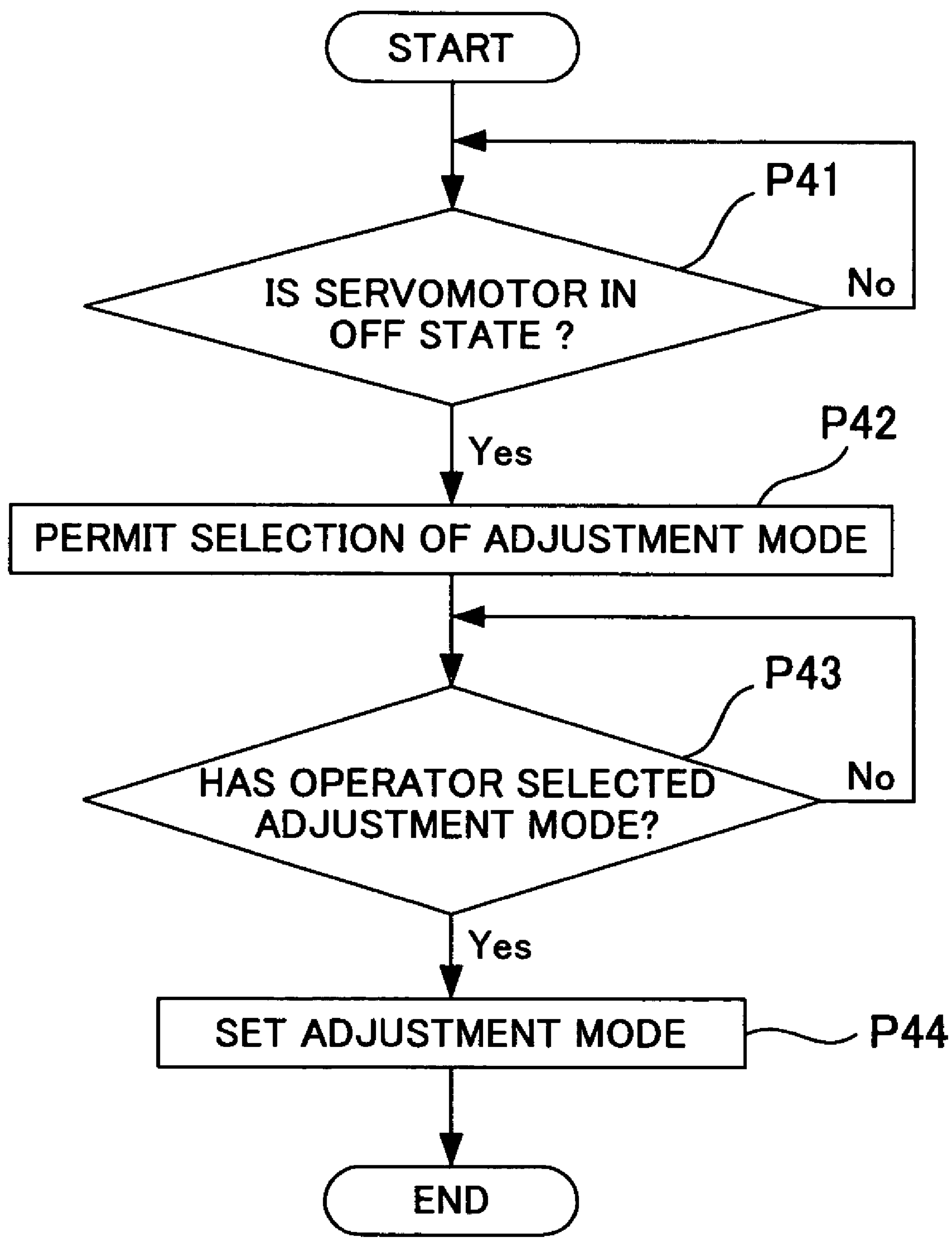
FIG. 7 is a view showing another program which is computationally operated by the information processor provided in the first embodiment of the communications system for a position detector according to the present invention.

Program (V):

This program switches the adjustment mode of the position detector 11. That is, as shown in FIG. 7, it is determined in Step P41 whether the motor 23 (servomotor) is in the OFF state. If the motor 23 is not in the OFF state (is in the ON state), the program returns to Step P41. If the motor 23 is in the OFF state (is not in the ON state), the program proceeds to Step P42. In Step P42, selection of the adjustment mode of the position detector 11 is permitted. Then, the program proceeds to Step P43, where it is determined whether an operator has selected the adjustment mode. If the operator has not selected the adjustment mode, the program returns to Step P43. If the operator has selected the adjustment mode, the program proceeds to Step P44. In Step P44, the adjustment mode of the position detector 11 is set, and the program comes to an end. Thus, the maintainer can easily switch the adjustment mode of the position detector 11, with the numerical control device 15 being connected.

Figure 8:
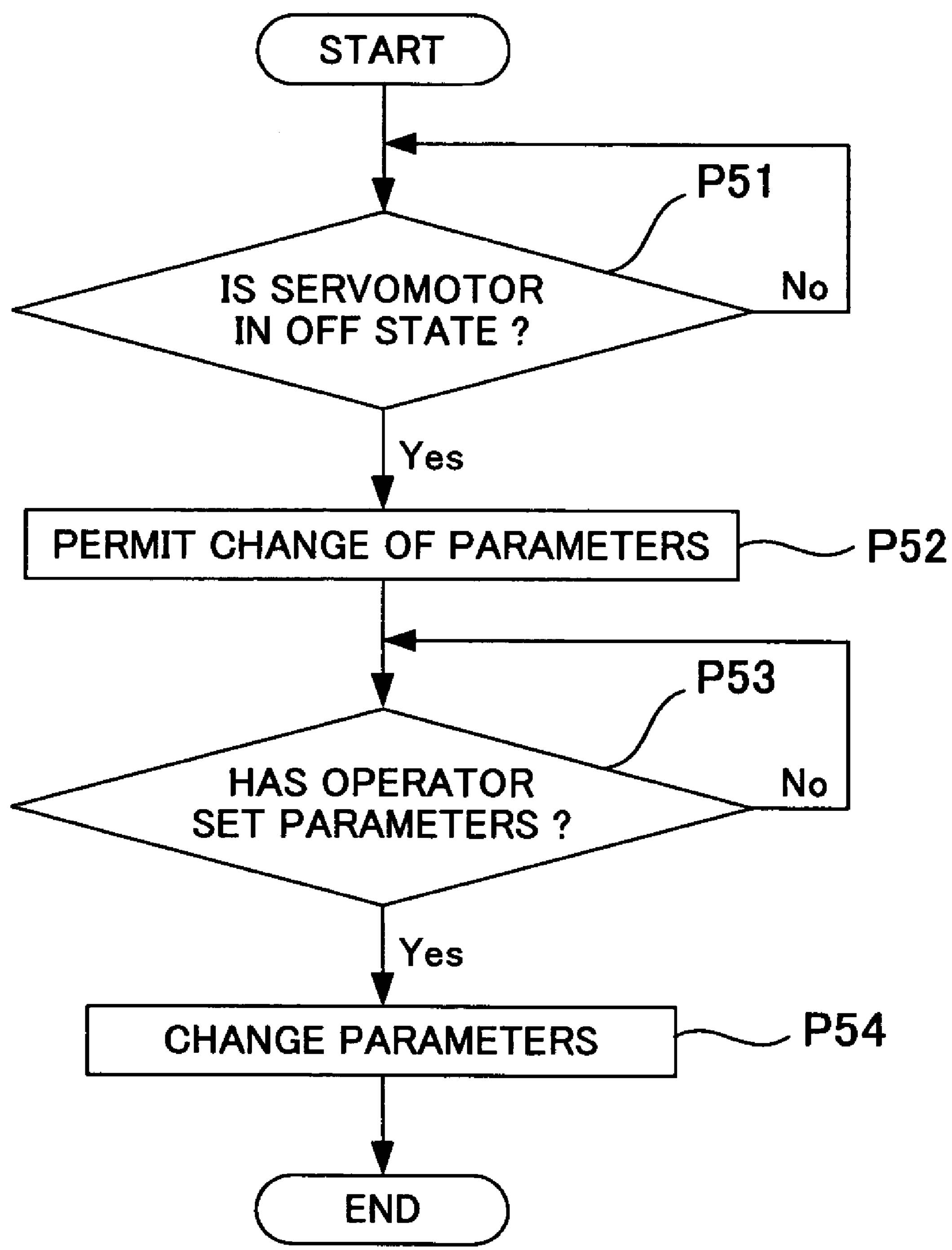
FIG. 8 is a view showing another program which is computationally operated by the information processor provided in the first embodiment of the communications system for a position detector according to the present invention.

Program (VI):

This program changes the internal parameters (e.g., time constant, gain, etc.) of the position detector 11. That is, as shown in FIG. 8, it is determined in Step P51 whether the motor 23 (servomotor) is in the OFF state. If the motor 23 is not in the OFF state (is in the ON state), the program returns to Step P51. If the motor 23 is in the OFF state (is not in the ON state), the program proceeds to Step P52. In this Step P52, change of the internal parameters of the position detector 11 is permitted. Then, the program proceeds to Step P53, where it is determined whether the operator has set the internal parameters. If the operator has not set the internal parameters, the program returns to Step P53. If the operator has set the internal parameters, the program proceeds to Step P54. In this Step P54, the internal parameters of the position detector 11 are changed to the internal parameters set in Step P53, whereupon the program ends. Thus, the maintainer can easily change the internal parameters of the position detector 11, with the numerical control device 15 being connected.

Figure 9:
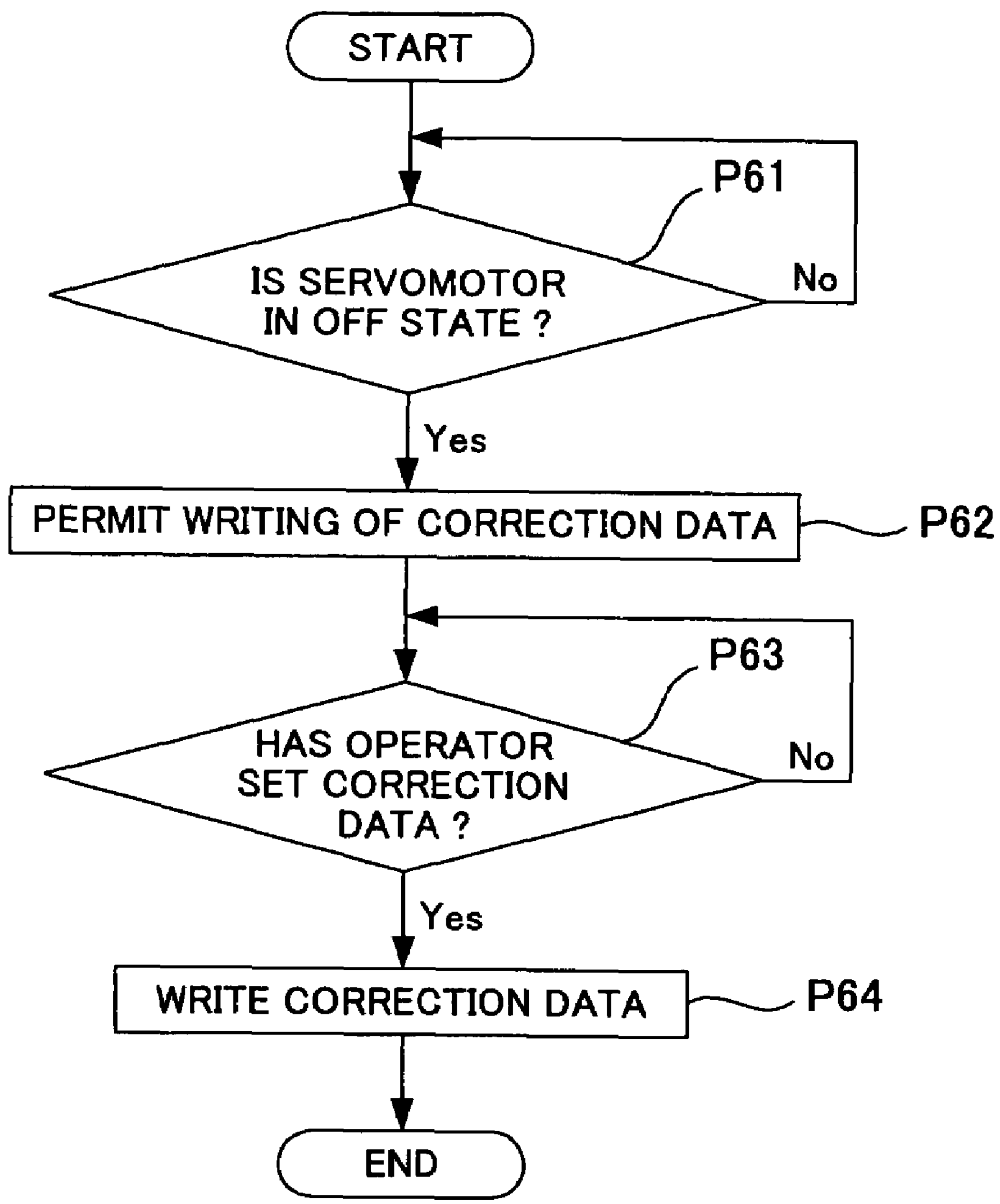
FIG. 9 is a view showing another program which is computationally operated by the information processor provided in the first embodiment of the communications system for a position detector according to the present invention.

Program (VII):

This program writes correction data into the position detector 11. That is, as shown in FIG. 9, it is determined in Step P61 whether the motor 23 (servomotor) is in the OFF state. If the motor 23 is not in the OFF state (is in the ON state), the program returns to Step P61. If the motor 23 is in the OFF state (is not in the ON state), the program proceeds to Step P62. In this Step P62, writing of correction data is permitted. Then, the program proceeds to Step P63, where it is determined whether the operator has set the correction data. If the operator has not set the correction data, the program returns to Step P63. If the operator has set the correction data, the program proceeds to Step P64. In this Step P64, the correction data is written, whereupon the program ends. Thus, the maintainer can easily write the correction data into the position detector 11, with the numerical control device 15 being connected.

Figure 10:
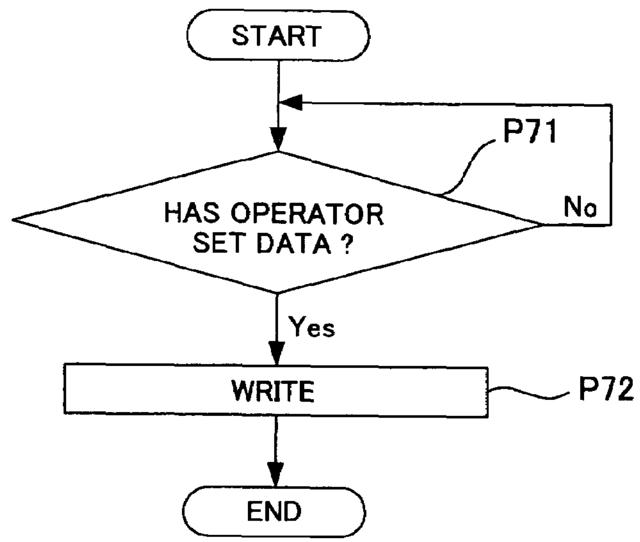
FIG. 10 is a view showing another program which is computationally operated by the information processor provided in the first embodiment of the communications system for a position detector according to the present invention.

Program (VIII):

This program writes a model, a manufacturer's serial number, and aversion at the time of manufacturing the position detector 11. That is, as shown in FIG. 10, it is determined in Step P71 whether the operator has set various data (e.g., model, manufacturer's serial number, version, etc.). If the operator has not set the various data, the program returns to Step P71. If the operator has set the various data, the program proceeds to Step P72. In Step P72, the various data are written, and the program ends. Thus, the maintainer can easily obtain the data available at the time of manufacture of the position detector 11, with the numerical control device 15 being connected.

Figure 11:
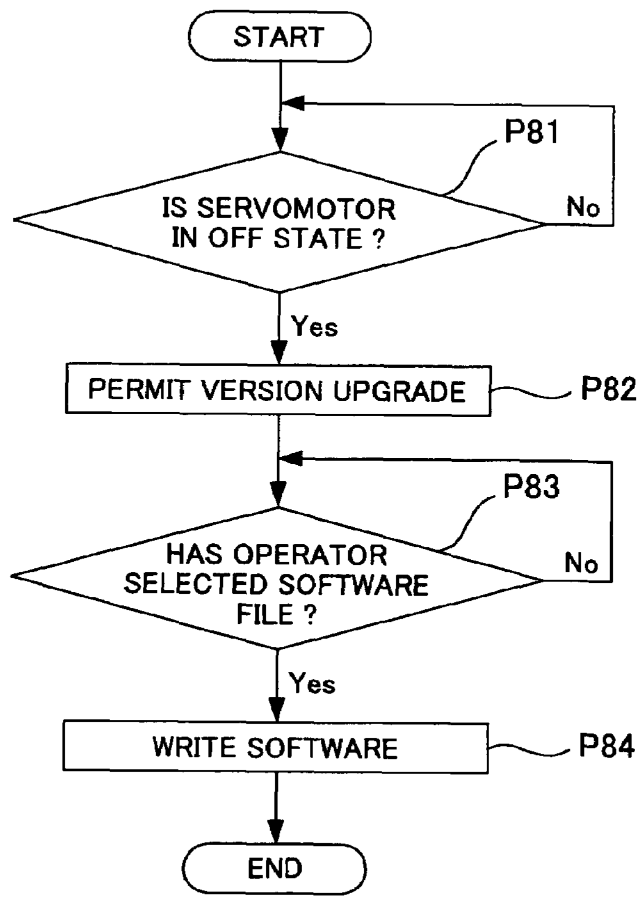
FIG. 11 is a view showing another program which is computationally operated by the information processor provided in the first embodiment of the communications system for a position detector according to the present invention.

Program (IX):

This program performs a version upgrade of the software of the position detector 11. That is, as shown in FIG. 11, it is determined in Step P81 whether the motor 23 (servomotor) is in the OFF state. If the motor 23 is not in the OFF state (is in the ON state), the program returns to Step P81. If the motor 23 is in the OFF state (is not in the ON state), the program proceeds to Step P82. In this Step P82, aversion upgrade of the software of the position detector 11 is permitted. Then, the program proceeds to Step P83, where it is determined whether the operator has selected a file of the software. If the operator has not selected the file of the software, the program returns to Step P83. If the operator has selected the file of the software, the program proceeds to Step P84. In this Step P84, the software selected in Step P83 is written, whereupon the program ends. Thus, the maintainer can easily perform the version upgrade of the software of the position detector 11, with the numerical control device 15 being connected. Since the software of the position detector 11 can be easily sent from the manufacturer of the position detector 11 to the user, version upgrade of the software of the position detector 11 can be performed by the user. This obviates the need for time and effort to replace the position detector itself as done in the past.

The above-described processings (programs (I) to (IX)) can be configured such that the software on the part of the information processor 16 is constructed by a dedicated DLL (a component of the software), and the user uses the DLL to prepare the user's own software for positional control or measurement by the information processor 16.

As described above, the communications system 30 for a position detector includes the position detector 11 for detecting the amount of movement of the table 21, the A/D converter 13 connected to the position detector 11, the numerical control device 15 connected to the A/D converter 13 and receiving a position signal converted by the A/D converter 13, and the information processor 16 connected to the A/D converter 13 via the USB 17 capable of bidirectional communication, and the information processor 16 has the computing section for computing data from the A/D converter 13. Because of this constitution, computations can be performed by the information processor based on the data inputted through the A/D converter, and the data necessary for maintenance can be indicated on the display section of the information processor 16 for the purpose of confirmation. Thus, it is possible to do maintenance work, without cutting off connection to the numerical control device 15. Furthermore, the information processor 16 is always connected to the A/D converter 13, and its bidirectional data communication with the A/D converter 13 is possible. Also, the system configuration during system maintenance is the same as that while the system is in operation. Thus, information on the instruments constituting the system can be entered into the information processor 16 through the A/D converter 13, thereby improving the accuracy of maintenance work on the system. This makes possible a high degree of setting which has been impossible with conventional software setting alone. The A/D converter 13, the information processor 16 and the USB 17 themselves are genera-purpose products, thus making the system 30 for the position detector versatile.

Besides, the information processor 16 indicates an abnormality on the display section, if none of (1) position data on the position detector 11, (2) internal state data on the position detector 11, (3) manufacturer's serial number data on the position detector 11, (4) model data on the position detector 11, (5) version data on the position detector 11, (6) internal signal data on the position detector 11, and (7) abnormality data on the position detector 11 can be obtained; or if the data (7) has been received; or if the data (6) deviates from the allowable value. According to this feature, the operator can easily determine the abnormality in the position detector 11. This facilitates maintenance work.

The information processor 16 is a device designed to enable setting of the adjustment mode of the position detector 11 if the internal signal data on the position detector 11 is within the prescribed value. According to this feature, setting of the adjustment mode can be made, without disconnection of the position detector 11 from the system, so that work efficiency is increased.

The information processor 16 is a device designed to preserve the following various data in the storage section on constant cycles: (1) position data on the position detector 11, (2) internal state data on the position detector 11, (6) internal signal data on the position detector 11, and (7) abnormality data on the position detector 11. According to this feature, the past state in the position detector 11 can be confirmed using the various data preserved in the storage section. Consequently, analysis can be made based on the past state of the position detector 11, whereby the accuracy of maintenance work can be improved.

The information processor 16 is a device designed to determine an abnormality, if the difference between the current data A on the position detector 11 and the data B thereon during installation exceeds the prescribed value. According to this feature, a failure due to the aged deterioration of the position detector 11 itself can be specified. Consequently, maintenance accuracy can be improved.

The information processor 16 is a device designed to be capable of setting the adjustment mode of the position detector 11. According to this feature, the adjustment mode can be set, without disconnection of the position detector 11 from the system, so that work efficiency can be increased.

The information processor 16 is a device designed to be capable of changing the internal parameters of the position detector 11. According to this feature, the internal parameters can be changed, without disconnection of the position detector 11 from the system, so that work efficiency can be increased.

The information processor 16 is a device designed to be capable of writing correction data for the position detector 11. According to this feature, the correction data can be written, without disconnection of the position detector 11 from the system, so that work efficiency can be increased.

The information processor 16 is a device designed to be capable of writing the model, the manufacturer's serial number, and the version of the position detector 11. According to this feature, the model, the manufacturer's serial number, and the version can be written, without disconnection of the position detector 11 from the system, so that work efficiency can be increased.

The information processor 16 is a device designed to be capable of writing software. According to this feature, software can be written, without disconnection of the position detector 11 from the system, so that work efficiency can be increased.

The communications system 30 for a position detector, which includes the information processor 16 capable of computationally operating the programs (I) to (IX), has been described above. However, the communications system may be one for a position detector which includes an information processor capable of computationally operating at least one of the programs (I) to (IX). Even such a communications system for a position detector shows the same actions and effects as those of the above communications system 30 for a position detector.

Other Embodiments

The foregoing first embodiment of the communications system for a position detector according to the present invention has been described using the communications system 30 for a position detector applied to the position detector 11 of the table 21 of the machine tool. However, the above communications system 30 for a position detector can be applied as a communications system for a position detector which detects the position of a machine, such as a tool for machining a workpiece installed on a table, or a rotationally movable table. Even such a communications system for a position detector shows the same actions and effects as those of the above communications system 30 for a position detector.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communications system for a position detector, comprising:

a position detector for detecting an amount of movement of a machine;

an A/D converter connected to the position detector;

a numerical control device connected to the A/D converter and receiving a position signal converted by the A/D converter; and an information processor connected to the A/D converter via bidirectional communication means capable of bidirectional communication, wherein the information processor is a device including a storage section for preserving data and a program, a computing section for computationally operating the program, and a display section for indicating results of computational operation by the computing section, and the data, and wherein the program has a function of indicating an abnormality on the display section, if none of position data on the position detector, internal state data on the position detector, manufacturer's serial number data on the position detector, model data on the position detector, version data on the position detector, internal signal data on the position detector, and abnormality data on the position detector can be obtained, or if the abnormality data on the position detector has been received, or if the internal signal data on the position detector deviates from an allowable value.

2. The communications system for a position detector according to claim 1, wherein the program has a function of determining whether internal signal data on the position detector is within a prescribed value when an adjustment mode of the position detector is set, and indicating acceptability or unacceptability of adjustment on the display section.

3. The communications system for a position detector according to claim 1, wherein the program has a function of preserving various data, including position data on the position detector, internal state data on the position detector, internal signal data on the position detector, and abnormality data on the position detector, in the storage section periodically.

4. The communications system for a position detector according to claim 1, wherein the program has a function of determining whether a difference between current data on the position detector and data thereon during installation thereof is within a prescribed value, and indicating abnormality or normality on the display section.

5. The communications system for a position detector according to claim 1, wherein the program has a function of setting an adjustment mode of the position detector.

6. The communications system for a position detector according to claim 1, wherein the program has a function of changing internal parameters of the position detector.

7. The communications system for a position detector according to claim 1, wherein the program has a function of writing correction data for the position detector.

8. The communications system for a position detector according to claim 1, wherein the program has a function of changing a software version of the position detector.

9. A machine tool including the communications system for a position detector according to claim 1, wherein the machine is a table on which a workpiece is installed, or is a tool for machining the workpiece.

* * * * *